United States Patent
Schabel, Jr.

(10) Patent No.: US 7,770,691 B2
(45) Date of Patent: Aug. 10, 2010

(54) LIGHTWEIGHT PELLETIZED MATERIALS

(75) Inventor: Norman G. Schabel, Jr., Rocky River, OH (US)

(73) Assignee: Schabel Polymer Technology, LLC, Rocky River, OH (US)

( * ) Notice: Subject to any disclaimer, the term of this patent is extended or adjusted under 35 U.S.C. 154(b) by 0 days.

(21) Appl. No.: 11/761,703

(22) Filed: Jun. 12, 2007

(65) Prior Publication Data

US 2007/0227814 A1 Oct. 4, 2007

Related U.S. Application Data

(63) Continuation-in-part of application No. 10/920,504, filed on Aug. 18, 2004.

(60) Provisional application No. 60/812,893, filed on Jun. 12, 2006.

(51) Int. Cl.
*F01N 1/14* (2006.01)

(52) U.S. Cl. ............... 181/259; 181/288; 524/1; 521/60

(58) Field of Classification Search ............... 181/259, 181/288; 428/407; 521/1, 60
See application file for complete search history.

(56) References Cited

U.S. PATENT DOCUMENTS

| | | | | |
|---|---|---|---|---|
| 2,079,374 A * | 5/1937 | Wilkins | ...... | 252/62 |
| 3,028,702 A * | 4/1962 | St Cyr | ...... | 215/395 |
| 3,540,977 A * | 11/1970 | Schickedanz | ...... | 428/318.6 |
| 3,567,807 A * | 3/1971 | Shannon | ...... | 264/29.1 |
| 3,822,806 A * | 7/1974 | Grimes | ...... | 215/11.3 |
| 3,987,134 A * | 10/1976 | Shiina et al. | ...... | 264/45.4 |
| 4,032,310 A * | 6/1977 | Ignoffo | ...... | 422/170 |
| 4,207,114 A * | 6/1980 | Schuster et al. | ...... | 501/84 |
| 4,272,572 A * | 6/1981 | Netherly | ...... | 428/35.5 |
| 4,541,240 A * | 9/1985 | Munro | ...... | 60/295 |
| 4,667,768 A * | 5/1987 | Wirt | ...... | 181/286 |
| 4,705,715 A * | 11/1987 | DeCoste et al. | ...... | 442/151 |
| 4,752,625 A * | 6/1988 | Wu et al. | ...... | 521/139 |
| 4,757,092 A * | 7/1988 | Hawrylko | ...... | 521/56 |
| 4,859,711 A * | 8/1989 | Jain et al. | ...... | 521/56 |
| 4,871,780 A * | 10/1989 | Sharaby | ...... | 521/56 |
| 4,953,659 A * | 9/1990 | Norris | ...... | 181/257 |
| 4,964,600 A * | 10/1990 | Lee | ...... | 248/146 |
| 4,997,504 A * | 3/1991 | Wood | ...... | 156/204 |
| 5,024,289 A * | 6/1991 | Merry | ...... | 181/231 |
| 5,044,705 A * | 9/1991 | Nelson | ...... | 312/228 |
| 5,073,444 A * | 12/1991 | Shanelec | ...... | 428/313.5 |

(Continued)

FOREIGN PATENT DOCUMENTS

JP 60030102 A * 2/1985

(Continued)

OTHER PUBLICATIONS

Machine translation of Kiyoshi form PAJ website.*

*Primary Examiner*—Jeffrey Donels
*Assistant Examiner*—Forrest M Phillips
(74) *Attorney, Agent, or Firm*—Tarolli, Sundheim, Covell & Tummino LLP

(57) ABSTRACT

A plurality of pellets include at least one of a snythetic, biomass, mineral, or polymer based material. The pellets can have a specific gravity of about 0.01 to about 0.3 g/cm³ and are dimensionally stable, substantially dust-free, substantially non-hygroscopic, and resistant to settling and compression.

23 Claims, 2 Drawing Sheets

U.S. PATENT DOCUMENTS

| | | | |
|---|---|---|---|
| 5,165,799 A * | 11/1992 | Wood | 383/8 |
| 5,180,752 A * | 1/1993 | Melber et al. | 521/57 |
| 5,232,772 A * | 8/1993 | Kong | 428/312.2 |
| 5,616,413 A * | 4/1997 | Shinozaki et al. | 428/402 |
| 5,618,111 A * | 4/1997 | Porchia et al. | 383/63 |
| 5,697,198 A * | 12/1997 | Ponder et al. | 52/742.13 |
| 5,738,922 A * | 4/1998 | Kobayashi et al. | 428/36.5 |
| 5,738,941 A * | 4/1998 | Pero et al. | 428/407 |
| 5,763,498 A * | 6/1998 | Knaus | 521/60 |
| 5,777,947 A * | 7/1998 | Ahuja | 367/1 |
| 5,851,626 A * | 12/1998 | McCorry et al. | 428/95 |
| 5,916,681 A * | 6/1999 | Cipin | 428/403 |
| 6,007,890 A * | 12/1999 | DeBlander | 428/72 |
| 6,085,865 A * | 7/2000 | Delverdier et al. | 181/292 |
| 6,322,044 B1 * | 11/2001 | Vangedal-Nielsen | 249/61 |
| 6,365,268 B1 * | 4/2002 | Williams et al. | 428/327 |
| 6,378,272 B1 * | 4/2002 | Archibald et al. | 53/412 |
| 6,394,652 B2 * | 5/2002 | Meyer et al. | 383/118 |
| 6,662,516 B2 * | 12/2003 | Vandehey et al. | 52/407.1 |
| 6,736,423 B2 * | 5/2004 | Simonian et al. | 280/731 |
| 7,226,969 B2 * | 6/2007 | Ristic-Lehmann et al. | 524/544 |
| 7,241,816 B2 * | 7/2007 | Kunimi et al. | 521/56 |
| 2001/0031355 A1 * | 10/2001 | Nakagawa et al. | 428/355 AC |
| 2003/0138632 A1 * | 7/2003 | Huang | 428/407 |
| 2004/0096665 A1 * | 5/2004 | Hoehne et al. | 428/407 |
| 2004/0121102 A1 * | 6/2004 | Chen et al. | 428/36.91 |
| 2004/0131853 A1 * | 7/2004 | Mushiake et al. | 428/402.22 |
| 2004/0167241 A1 * | 8/2004 | Scherzer et al. | 521/79 |
| 2004/0191518 A1 * | 9/2004 | Naito et al. | 428/407 |
| 2004/0231916 A1 * | 11/2004 | Englert et al. | 181/294 |
| 2005/0100728 A1 * | 5/2005 | Ristic-Lehmann et al. | 428/323 |
| 2006/0118355 A1 * | 6/2006 | Blomeling et al. | 181/286 |
| 2006/0167122 A1 * | 7/2006 | Haraguchi et al. | 521/60 |
| 2006/0223897 A1 * | 10/2006 | Sasaki | 521/60 |
| 2006/0240258 A1 * | 10/2006 | Sato et al. | 428/403 |
| 2006/0246289 A1 * | 11/2006 | Ueda et al. | 428/403 |
| 2006/0275598 A1 * | 12/2006 | Shimamura et al. | 428/323 |
| 2007/0125780 A1 * | 6/2007 | Shiina et al. | 220/23.87 |
| 2007/0141281 A1 * | 6/2007 | Eadara et al. | 428/34.4 |
| 2007/0237958 A1 * | 10/2007 | Eramo | 428/407 |
| 2007/0254972 A1 * | 11/2007 | Haraguchi | 521/60 |
| 2007/0259183 A1 * | 11/2007 | Knobloch | 428/405 |
| 2007/0272320 A1 * | 11/2007 | Roberson | 138/149 |
| 2008/0069960 A1 * | 3/2008 | Abu-Shanab et al. | 427/354 |
| 2008/0085566 A1 * | 4/2008 | Swager et al. | 436/172 |
| 2008/0176971 A1 * | 7/2008 | Sugawara et al. | 521/145 |

FOREIGN PATENT DOCUMENTS

JP  20051663377  *  6/2005

* cited by examiner

LIGHTWEIGHT PELLETIZED MATERIALS

RELATED APPLICATION

This application claims priority from U.S. Provisional Application No. 60/812,893, filed Jun. 12, 2006, which is a C.I.P. of U.S. Ser. No. 10/920,504, filed Aug. 18, 2004, the subject matter of which is incorporated herein by reference.

FIELD OF THE INVENTION

The present invention relates to an engineered lightweight pelletized or beaded material.

BACKGROUND OF THE INVENTION

A variety of insulation materials have been proposed for abating sound and thermal transmission from a source thereof to some protected area or enclosure. For example, insulation materials can be used to abate sound or thermal transmission through the walls and ceilings of houses, buildings and the like; from appliances, such as washing machines, refrigerators, and dishwashers; from the exterior of vehicles, such as automobiles, airplanes, trains, and ships; from machinery, such as presses, compressors, blowers, and HVAC systems; and from tanks, storage vessels, pipes and duct work.

The use of glass fiber blowing-wool or loose-fill insulation is well-known and increasing in popularity for thermal insulation. Loose-fill insulation is preferred by many contractors because it can be easily and quickly applied in both new construction, a well as in existing structures. Further, loose-fill insulation is a relatively low-cost material.

As the name implies, loose-fill insulation is not formed into a blanket or batt prior to installation. Rather, the product is generally installed by pneumatically blowing the loose-fill insulation into the desired area. Accordingly, loose-fill insulation in an unconstrained space, such as an attic, is not as compacted as blanket insulation, occupying a greater volume than an equivalent amount of blanket insulation. As a result, the thermal resistance or R value of loose-fill insulation is generally lower than that of blanket insulation. That is, loose-fill insulation currently used in the industry does not prevent the conduction of heat as well as blanket insulation. To compensate for the higher conductivity of loose-fill, it is applied in greater depth than blanket insulation to achieve an equivalent R-value.

When designing loose-fill or blown insulation products of glass fibers, the ideal insulation would have uniform spacing and density once installed. Insulation is basically a lattice for trapping air between the fibers and thus preventing movement of air. The lattice also retards heat transfer by scattering radiation. A more uniform spacing and density would minimize air movement and maximize scattering and, therefore, would have greater insulating capability.

Traditional loose-fill or blown insulation comprises straight or short fibers. Batts of bindered or unbindered glass fibers are cut, compressed and bagged for shipment. Upon installation, the compressed loose-fill is added to the hopper of a blower where the loose-fill is mechanically recovered and broken into smaller portions. After being blown into position, numerous small gaps or voids remain between the blown portions of insulation. These voids raise the thermal conductivity of the insulation requiring more glass to be employed to achieve a specified insulating value, or result in a shortfall in insulating value. Further, the blown insulation includes relatively ineffective insulating flakes or wads of the insulation incorporated into the blown insulation. These flakes or wads add significantly to the density of the insulation, in essence increasing the amount of glass used relative to its insulating value.

SUMMARY OF THE INVENTION

The present invention relates to an engineered material that comprises a plurality of pellets. The pellets can include at least one of a polymer, mineral, synthetic, or biomass based material. The pellets can have a substantially homogenous structure, a specific gravity of at least about 0.01 to about 0.3 and be substantially free-flowing, substantially dust-free, dimensionally stable, substantially non-hygroscopic, and resistant to settling and compression.

In an aspect of the invention, the pellets can comprise an expanded material. The expanded material can include at least one of expanded polymers, expanded glasses, expanded mineral materials, or expanded biomass material.

The material can have an R-value of about 2.0 to about 4.0 and be either untreated or be substantially encapsulated with a coating. The coating can be substantially free of voids and comprise less than about 20% by volume of the pellets. The coating can be selected from the group consisting of a coupling agent, a urethane, an epoxy, an acrylic, a silicone, a latex, an alkyd, an oleoresinous vehicle, a water reducible resin, and blends thereof. The pellets can also include at least one of a biocide, fungicide, insecticide, rodenticide, mildewcide, batericide, colorant, flame retardant, smoke suppressant, radiation absorber or anti-blocking agent.

In another aspect of the invention, the pellets can comprise at least one of expanded polyethylene, expanded polypropylene, copolymers thereof or blends thereof as well as expanded glass beads, expanded mineral based materials, such as expanded clay, expanded bentonite, expanded montmorillonite, expanded calcium carbonate, or expanded calcium sulfate.

The pellets when used as an insulation material can have a bulk density of about 1 to about 18 pounds per cubic foot. The pellets when used as a bulk insulation can be free-flowing and have an average size of about 1 mm to about 25 mm.

The pellets can be provided in a coating composition or fluid carrier system. The coating composition or fluid carrier system can be capable of adhering to the surface of a structural assembly or merely act as a method of installation. The pellets can also be provided in at least one of a mastic, paste, adhesive, spackle, or stucco. The pellets can further be adhered in a paste form or in an adhesive mass to a flexible sheet that is capable of being wrapped about or adhered to a structural assembly, or provided in a bag or pouch that can be installed in a cavity of a structural assembly.

In another aspect of the invention, the pellets can be used as a filler, extender, or spacer material in formulating and compounding applications. When used as a filler or extender, the pellets can have an average diameter of about 0.1 mm to about 12 mm (e.g., about 0.1 mm to about 2.5 mm). When used as a spacer material, the pellets can have an average diameter of about 12 mm to about 25 mm.

BRIEF DESCRIPTION OF THE DRAWINGS

Further features of the present invention will become apparent to those skilled in the art to which the present invention relates from reading the following description of the invention with reference to the accompanying drawings in which.

DETAILED DESCRIPTION

Figure 1:
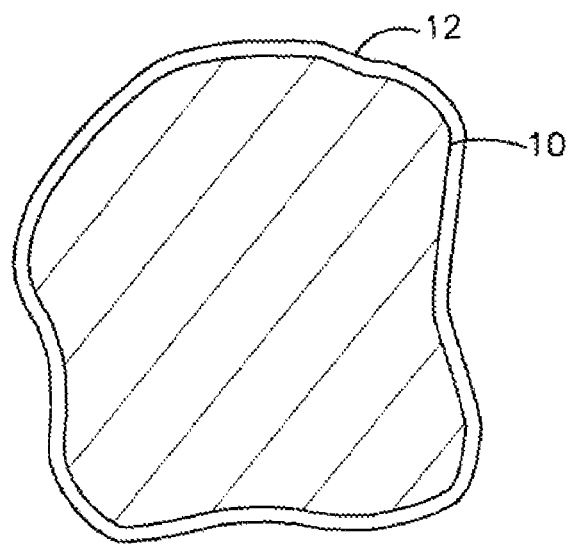
FIG. 1 illustrates a schematic cross-sectional view of a pelletized material in accordance with an aspect of the invention.

The present invention relates to an engineered pelletized material that can be used in insulation applications as well as industrial formulating and compounding applications. By pelletized, it is meant that the engineered material is in the form of distinct pellets, such as particles, granules, chips, nodules, or prills and is not in the form of fibers, filaments, whickers or other high aspect ratio forms where, for example, the length to diameter is greater than about 20. The pelletized material can be used in any assembly including vehicles, such as railway cars, buses, trailers, automobiles, boats, airplanes, helicopters, and mobile homes; temporary partitions, such as office dividers; appliance, such as dishwashers, washing machines, and refrigerators; in construction assemblies, such as a closed wall or ceiling cavities; and fabrications; as well as applied to open walls, ceilings, roofs, structural panels; and machinery, such as presses, compressors, blowers, and HVAC systems; as well as around storage vessels, tanks, pipes and duct work. Advantageously, the pelletized material in accordance with the present invention can be used in both new and retrofit applications. The pelletized material can also be used as a filler or extender in industrial formulating and compounding applications.

The pelletized material in accordance with the present invention comprises a substantially homogenous pelletized polymer based material, mineral based material, synthetic based material, and/or biomass based material that is free-flowing, dimensionally stable, substantially dust-free, substantially resistant to settling and compression once installed for insulation applications, and substantially non-hygroscopic. By substantially resistant to settling and compression, it is meant that the pelletized material once applied retains its shape and/or integrity as well as exhibits an increase of bulk density over time of less than about 10%, for example less than about 5%. By substantially non-hygroscopic, it is meant that the pelletized material is resistant to moisture absorption from its surroundings during handling, storage, or after application.

The pelletized material has a specific gravity of about 0.01 to about 0.3. For example, the specific gravity of the pelletized material can be varied from about 0.01 to about 0.15. The specific gravity as well as the composition of the pelletized material can be tailored to provide a pelletized material that is capable of damping, attenuating, and/or isolating various energies, such as vibrational energy, acoustic energy, thermal energy, electromagnetic energy, or radio waves. For example, the pelletized material in accordance with the present invention can have a thermal resistance value (i.e., R-value) of at least about 2.0 per inch (e.g., about 2 to about 4) and a sound attenuation factor (i.e., STC factor) of at least about 30. The pelletized material in accordance with the present invention can also be clean handling and have a minimal toxicity, high heat resistance, low rate of moisture absorption, and high dimensional stability.

In one aspect of the invention, the pelletized material can comprise expanded, foamed, and/or multi-cellular polymer pellets (e.g., expanded polymer spheres or pellets) that have an average pellet size of about 0.1 mm to about 25 mm. The expanded polymer pellets can include thermoplastic or thermoset synthetic polymers that when expanded, blown, or gasified have a specific gravity of about 0.01 to about 0.3. The thermoplastic or thermoset polymers can comprise reclaimed, recycled, wide-specification, and/or virgin polymer resins. Examples of thermoplastic and thermoset polymers can include nylon, PVC, PVDC, polyethylene, polystyrene, polypropylene, polyphenylene oxide (PPO), ethylene propylene-diene monomer (EPDM), polyacrylonitrile (PAN), fluorocarbons, polyurethanes, acrylic resins, acrylates, silicone based resins, polymer alloys thereof, copolymers thereof, and blends thereof.

The expanded thermoplastic or thermoset polymer can be an elastomer, such as styrene-ethylene-butylene-styrene (SEBS), styrene-butadiene-styrene (SBS), ethylene-propylene-diene-monomer (EPDM), and blends thereof, a non-elastomer, or blends of polyethylene, polypropylene, and other thermoplastic elastomers. The thermoplastic polymer can also be modified by cross-linking or vulcanization to form a rubber.

In an aspect of the invention, the thermoplastic or thermoset polymer can be expanded by combing the polymer with a blowing agent to foam the polymer and produce expanded or foamed pellets comprising a plurality of closed cells. An example of one type of blowing agent that can be used in accordance with the present invention is a chemical foaming agent. A chemical foaming agent is a foaming agent that upon exposure to an elevated temperature undergoes a chemical reaction and produces a gas. The chemical foaming agent can be an endothermic chemical foaming agent, an exothermic chemical foaming agent, or a mixture of an endothermic chemical foaming agent and an exothermic chemical foaming agent. By "endothermic chemical foaming agent", it is meant a chemical foaming agent that reacts endothermically to produce a gas. By "exothermic chemical foaming agent", it is meant a chemical foaming agent that reacts exothermically to produce a gas.

The thermoplastic or thermoset polymer can also be expanded using other blowing agents, such as compressed gases, which expand during formation of the pelletized material, and liquids, such as water, carbon dioxide, butane, pentane, hexane, and nitrogen, that develop closed cells in the pelletized material when they change to gases.

In an aspect of the invention, polymer blends, alloys and co-polymers can be advantageously formulated to utilize the differences in polymer structure, compatibility and melt properties to form a skin on the surface of the pellets or beds in the heat processing stages. This skin can provide improved surface and performance properties to the pellet, and reduce or eliminate the need for a subsequent coating layer, as described above. For example, a pellet of expanded polystyrene can be modified with about 0.5% to about 10% polyolefin (e.g., polypropylene), such as about 1% to about 3% polyolefin, which will migrate or "bloom" to the surface during an extrusion or heat expansion process. This polyolefin modification enhances surface characteristics, increases chemical and heat resistance and mitigates static charge, a common problem with expanded polystyrene.

In another aspect of the invention, the pelletized material can comprise expanded mineral or ceramic pellets (e.g., expanded clay pellets or expanded glass spheres) that have an average pellet size of about 0.1 to about 25 mm. The expanded mineral or ceramic pellets can include any mineral material or ceramic material that when expanded, blown, or gasified has a specific gravity of about 0.01 to about 0.3. Examples of mineral materials or ceramic materials can include clay, perlite, vermiculite, bentonite, montmorillonite, aluminum silicates, slate, kaolin, diatomite, keratin, mica, calcium carbonate, calcium sulfate, silica, silicate, calcium carbonate, calcium sulfate, and combinations thereof.

In one example, the expanded mineral or ceramic pellets can comprise expanded clay materials. The expanded clay materials can be made, for example, by feeding clay agglomerates into a rotary kiln. The clay agglomerates can be fired (e.g., sintered or calcined) and expanded at a temperature increasing up to about 900° C. in the firing zone.

The expanded clay materials are ceramic products, which upon removal from the kiln, are approximately ball-shaped and normally have a diameter within the range of about 0.1 to about 25 mm. The expanded clay materials have an internal structure with a large number of air bubbles in a matrix of fired clay. The outer surface is relatively dense and forms a barrier against free flow of fluids from the surroundings into the expanded ball.

In another example, the expanded mineral based or ceramic pellets can comprise expanded or foamed glass or glass-like material. The glass or glass-like material can be a virgin, reclaimed, or recycled material. The expanded glass and/or glass-like pellets can be produced, for example, from glass and/or glass-like material and an activator. The activator, which brings about the formation of pores in the glass and/or glass-like material in the course of expansion in the expanding furnace or in an expanding pipe, can be composed of silicon, silica, silicate, silicon carbide and carbon as well as borax or at least one metal oxide.

The expanded glass and/or glass-like pellets can also be produced from a liquid slag or liquid glass that can be foamed directly by mixing a gas-forming foaming agent into the liquid melt. The foaming agent releases gas immediately after contact with the hot slag and causes the latter to foam.

In another aspect of the invention, the pelletized material can comprise a biomass base material, such an agricultural or textile waste material and/or by-product. The biomass material can include, for example, any kind of waste or by-product from hemicellulose-containing lignocellulosic materials. These materials can include waste or by-products from whole or coarse ground grains and pulse crops, such as durum wheat, hard red spring wheat, corn, barley, rice, sunflower and beans. Such by-products or waste can include corn fiber, oat hulls, rice hulls, wheat middling, cotton-mill by-products, soy bean hulls, wheat hulls, alfalfa seed, sunflower seed, as well as barley and beet sugar pulp derivatives.

The term "hull" generally denotes the outer covering, rind, shell, pod or husk of any fruit or seed, but the term as employed herein also embraces, for example, the outer covering of an ear of maize. Hulls of cereals, including those mentioned among the above hulls, and others are generally of interest in the context of the invention. In this connection it may be mentioned by way of example that oat hulls are often available in large quantities at low cost as a by-product of oat-processing procedures for the production of oatmeal, porridge oats, rolled oats and the like. Other types of hulls of relevance in relation to processes of the invention include, for example, rice hulls, palm shells, peanut shells, coconut shells, other types of nut sheets, and coconut husk.

It should be noted that the native physical form, bulk and/or dimensions of lignocellulosic materials may necessitate, or at least make it desirable, to carry out comminution of the material (e.g., by milling, abrading, grinding, crushing, chopping, chipping or the like) to some extent in order to obtain pellets, pieces, strands, wafers, flakes or the like of material of sufficiently small size and/or sufficiently high surface area to mass ratio. In contrast, numerous types of hulls, e.g. cereal grain or seed hulls in general, including oat hulls and rice hulls as employed in the working examples reported herein, have in their native form sufficiently small dimensions and a sufficiently high surface area to mass ratio to enable them to be used directly, without prior comminution, as lignocellulosic materials in a process according to the present invention.

The biomass base material can be sifted or separated to a particular size and include a coating and additives to prevent mold, kill bugs and generally treat and encapsulate the base material.

In a further aspect of the invention, the pelletized material can comprise crumb rubber, rubber based, or polymer based material. The crumb rubber used in the pelletized material of the invention can include rubber pellets that have an average particulate size of about 0.1 mm to about 25 mm. The crumb rubber pellets can include a natural, thermoplastic or snythetic rubber or mixtures of the rubbers. In most cases, the rubber can be compromised of repeat units, which are derived from one or more conjugated diolefin monomers, such as 1,3-butadiene or isoprene. Examples of snythetic rubbers are polysulfides, polychloroprene, butadiene-styrene copolymers (SBR), polyisoprene, butyl rubber (isobutylene-isoprene copolymers), polyacrylonitrile, polyurethane, silicone and nitrile (acrylonitrile-butadiene copolymers) polybutadiene polymers, styrene-isoprene, isoprene-butadiene rubber, styrene-isoprene-butadiene (SIBR), nitrile rubber (NBR) or carboxylated nitrile polymers (XNBR). Thermoplastic rubbers include block copolymers of styrene-butadiene or styrene isoprene.

The rubber may be obtained from recycled or reclaimed scrap rubber material. Included among the types of scrap rubber materials contemplated for use in the present invention are those derived from natural rubber, ethylene propylene diene polymer (EPDM), EPM copolymer, styrene butadiene rubber, polybutadiene rubber and nitrile rubber. Examples of types of post industrial scrap rubber sources include, (1) rubber scraps and rejected rubber parts generated from tire manufacturing processes, such scraps constituting mostly styrene butadiene rubber, polybutadiene rubber and natural rubber, (2) rubber scraps generated from automobile parts molding processes, such as molding flashes and rejected rubber parts, such scraps constituting EPDM rubber, (3) rubber scraps generated from extrusion processes in the manufacture of automobile windshields and window seals, such as start up rejects, blemished portions and rejected lengths, such scraps constituting EPDM rubber, (4) rubber scraps generated from calendaring processes in the manufacture of EPDM roofing membranes, such as torn sections, blemished and short run rejects, and (5) rubber scraps generated in the manufacturing processes of natural rubber latex gloves. Rubber scrap materials that are recovered from used articles discarded after use, conventionally termed "post consumer rejects", can also be used. These rubber scraps can include, for example, (1) used passenger tires which are ground into fine powders and composed mostly of styrene butadiene rubber, (2) used truck tires ground into powders, most of which is composed of natural rubber and to a lesser degree, polybutadiene rubber, (3) rubber automobile parts obtained from vehicle recovery programs (such as Ford Motor Company's Vehicle Recycling Program) which are segregated into EPDM based parts of windscreens and window seals, and (4) natural rubber latex gloves used in electronics assembly lines and gathered after use for disposal.

The crumb rubber can be produced from the scrap rubber by grinding or shredding the scrap rubber and removing fibrous and steel material from the ground rubber. The recovery and use of such crumb rubber pellets are more fully described in U.S. Pat. No. 5,811,477, the description of which is incorporated herein by reference. It will be appreciated that the crumb rubber need not be from scrap rubber sources and any portion or all of the rubber may be prime grade material.

It will also be appreciated by one skilled in the art that other pelletized rubber based and/or polymer based materials can be included in the pelletized material. These other pelletized rubber based and/or polymer based materials can include pellets of polymers, such as thermoplastic and thermosetting synthetic polymers. Examples of thermoplastic or thermoset polymers can include nylon, PVC, polyethylene, polystyrene, polypropylene, fluorocarbons, polyurethanes, acrylic resins (acrylates), and blends thereof. Preferred thermoplastic polymers include polyethylene, polypropylene, and blends thereof. Examples of thermosetting polymers can include cross-linked polyethylene, phenolics, epoxies, polyurethanes, and polyester resins.

Pellets of these thermoplastic and thermosetting polymers can be obtained from scrap polymers, plastics, and/or elastomers as well as wide specification, virgin, or prime resin. The scrap thermoplastic and/or thermosetting synthetic polymer can be reground or recycled to provide the pellets. Examples of particular scrap plastic resin components contemplated for use in the present invention are polypropylene copolymers (PP), polyethylene, low density polyethylene (LDPE) and high density polyethylene (HDPE), TPE as well as recycled plastic resins of these materials, such as polypropylene, polyethylene, and polyethylene terephthalate, derived from recycling processes in the recovery of used battery cases, beverage bottles and plastic shopping bags. It is to be understood that the types of scrap polymers, plastics, eloastomers, and/or resins disclosed herein are meant to be illustrative only and that scrap polymers, plastics, elastomers, and/or resins derived from other sources may be used in the instant invention.

It will be appreciated that the pelletized material can include combinations, blends, or mixtures of the expanded polymer, expanded mineral, expanded ceramic, biomass, crumb rubber or polymeric materials. The particular combination, blend, or mixture will depend on such factors as the specific application or use of the pelletized material, as well as the commercial availability.

It will also be appreciated that the pelletized material can be provided in a polydiverse pellet size distribution. By this it is meant that the pelletized material can comprise a blend of pellets with different sizes and that these pellet sizes (or diameters) can range from about 0.1 mm to about 25 mm. Additionally, the pellets can comprise different shapes, including rounded, spherical, cylindrical, irregular (e.g., multi-faceted shapes) and regular shapes.

Each of the pellets of expanded polymer, expanded mineral, expanded ceramic, biomass, crumb rubber or polymeric materials used to form the pelletized material can be untreated or can be provided with a void-free surface coating that encapsulates individual pellets. By void-free, it is meant the coating encapsulating each pellet is substantially free of voids, cavities, and does not have an expanded or cellular structure. FIG. 1 is a schematic cross-sectional view of an example of a pellet 10 provided with a surface coating 12. The surface coating 12 can have a thickness less than about 0.10 mm. By way of example, the surface coating 12 has a thickness less than about 100 microns (e.g., about 50 microns).

The surface coating 12 in accordance with the present invention can comprise any coupling agent and/or polymeric material. The surface coating can enhance humidity resistance and/or minimize hygroscopic characteristics. Expanded polymer, expanded mineral agglomerates, expanded ceramic, biomass, crumb rubber or polymeric materials can potentially include compounds, such as volatile organic compounds (e.g., organic plasticizers and organic solvents) or residual chemicals that can be released (e.g., emitted and/or evaporated) from the material. For example, crumb rubber typically includes about 1% to about 2% volatile organic compounds, which can evaporate from the rubber over time. The released compound can be in the form of liquid or gas, which can be malodorous as well as potentially toxic when accumulated (e.g., ingested or inhaled) in a high enough percentage. The coating of the present invention can substantially mitigate the release of such gas or liquid to allow the pelletized material to be substantially non-toxic and odorless. This allows pelletized materials that include VOCs to be used in home insulation applications. In addition to mitigating the release of VOCs and odors, the coating 12 in accordance with the present invention can improve heat stability or frame retardance of the pelletized material as well as incorporate biocide, anti-blocking, and/or anti-agglomeration effects to the pellets.

Coupling agents that can be used as a surface coating 12 in accordance with invention include silanes, such as organic silanes (e.g., $R_nSi(OR)_{4-n}$ with "R" being an alkyl, aryl, or organofuncitonal group and with "OR" being methoxy, ethoxy, or acetoxy) as well as amino silanes, and hydroxy silanes (e.g., SILQUEST, such as A-174, A-189 and A-1100, which are commercially available from GE Advanced Materials). Polymeric materials that can be used as the coating agent include a urethane, an epoxy, an acrylic, a silicone, a latex, a siloxane, an alkyd, oleoresinuous vehicles, water based resin, and blends thereof.

It will be appreciated by one skilled in the art that other polymeric materials, as well as other coupling agents, can be used to form the surface coating 12. It will also be appreciated that the pelletized material need not be provided with a surface coating 12.

The pellets of expanded polymer, expanded mineral, expanded ceramic, biomass, crumb rubber or polymeric materials can be provided with the surface coating 12 using conventional coating methods. Such conventional coating methods can include spray coating, dip, or immersion coating, as well as barrel coating methods or other variations of these methods. It will be appreciated that the particular coating method will be dependent on the particular polymer and/or coupling agent used to form the surface coating 12.

The pelletized material in accordance with the present invention can further include one or more agents that can act as a flame retardant, smoke suppressant, biocide, fungicide, insecticide, mildewcide, bactericide, rodenticide, colorant, radiation absorber (e.g., actinic, or UV), or anti-blocking agent. For example, a number of various insecticides or mildewcides can be used including organic based compounds, such as borax, boric acid, barium metaborate, or other organo-chemical compounds. Organic based insecticides that can be used include, for example, those sold under the names Diazinon and Malathion. Examples of flame retardants that can be used include alumina hydrate, antimony oxide, bromines, and/or borax hydrate, which on combustion release water or other compounds to extinguish flames. The colorant can be added to facilitate identification of particular blends. These agents can be compounded with the pellets of expanded polymer, expanded mineral, expanded ceramic, biomass, crumb rubber or polymeric materials or with the surface coating material.

Optionally, the pelletized material can include at least one filler. The filler can comprise any relatively inert substance that can be used to modify (e.g., increase or decrease) the density of the pelletized material so that the pelletized material has a specific gravity of about 0.01 to about 0.3. The filler will generally be in the form of small particles (e.g., less than about 0.5 mm), although it will be appreciated that larger particles (e.g., greater that about 0.5 mm) can also be used. The filler in addition to modifying the density of the pelletized material can also be used to provide or modify other properties of the pelletized material. For example, the filler can be used to modify the thermal and/or acoustic insulation properties. Moreover, the filler can act as a flame retardant, smoke suppressant, biocide, insecticide, rodenticide, pigment, free-flow additive, and/or surface texture modifier.

Examples of fillers that can be used in accordance with the present invention can include clay, talc, dolomite, calcium carbonate, calcium sulfate, fly ash, perlite, vermiculite, aluminum, hydrate, antimony oxide, barium sulfate, carbon black, kaolin, diatomite, keratin, mica, and molybdenum disulfide, glass beads, silica, silicate, aluminum silicates, ground rubber, ground thermoplastic or thermoset plastic material as well as any of the previously described biomass materials. It will be appreciated that the fillers used in accordance with the present invention need not be limited to the foregoing fillers and that other fillers can also be used. The filler, like the additives, can be compounded with the pellets of expanded polymer, expanded mineral, expanded ceramic, biomass, crumb rubber or polymeric materials or mixed with the surface coating.

Optionally, small amounts of a free-flow additive and/or a carrier fluid can be added to the surface of the pelletized material to facilitate transport and free-flow of the pelletized material. The free-flow additive can include a powdered material, such as talc, that can be applied to the surface coating material. The carrier fluid can include an oil, such as silicone oil or mineral oil, or other inert fluid that can be readily mixed with the pelletized material.

In an aspect of the invention, the pelletized material can be used alone as a free flowing dry pelletized insulation material. When used as a free-flowing, dry, pelletized insulation material, the pelletized insulation material can have an average pellet size of about 1.0 mm to about 25 mm. This average pellet size allows the free-flow pelletized material to be readily provided in cavities of construction assemblies, such as crawl spaces, walls, and between ceiling joists or floor joists, by conventional pumping or blowing methods. It will also be appreciated that the free-flowing pelletized insulation material can be provided with a polydiverse pellet size distribution and different shapes to tailor the packing density and void density of the insulation material. Adjusting material composition, density, and size allows both the thermal and acoustic insulation properties of the pelletized insulation to be readily adjusted for specific applications.

Apparatuses for pumping or blowing pelletized insulation material in cavities of construction or structural assemblies are well known, e.g., Unisul VOLUMATIC Commercial Blowing Machine. These apparatuses can typically include a feed pipe that is connected to a blower or pump. The blower or pump can provide an air stream or create pressure, which will move the pelletized insulation material through the feed pipe to the cavity.

Optionally, the pelletized insulation material can be brought to the point of installation of a construction assembly, such as a wall or ceiling cavity, in the form of a continuous roving or strand that can be wrapped or wound about a spool. At the point of installation, the continuous roving or strand can be unwound and continuously passed through a cutting device or "chopper gun". The cutting device cuts or chops the roving or strand into a free-flowing dry pelletized material (e.g., average pellet size of about 1.0 mm to about 25 mm) that can be installed in the wall or ceiling cavity. It will be appreciated by one skilled in the art that other methods or means of providing the free-flowing pelletized material in cavities of construction or structural assemblies can also be used. It will also be appreciated that longer strands with length up to about 10 to about 20 cm or longer can be advantageously employed.

Figure 2:
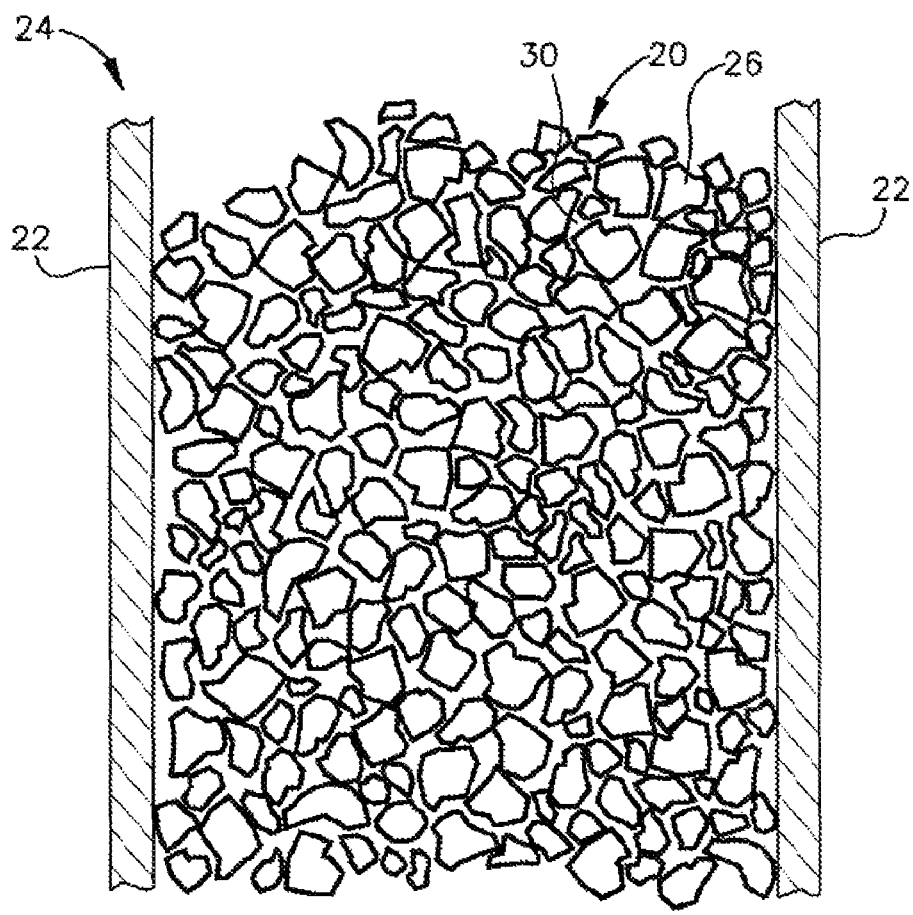
FIG. 2 illustrates the pelletized material provided between the walls of a construction assembly.

FIG. 2 is a schematic illustration that shows the free flowing pelletized insulation material 20 provided between walls 22 of a construction assembly 24. The free-flowing pelletized insulation material 20 can be arranged between the walls 22 such that individual pellets 26 contact each other and form an insulation with a plurality of dead air-cells 30 substantially uniformly distributed between the pellets 26. These dead air-cells 30, along with the specific density and visco-elastic properties of the polymer, provide both thermal and acoustic isolation and damping effects. The free-flowing pelletized insulation material 20 provided between the walls 22, unlike fibrous or expanded insulation, is resistant to compaciton and, therefore, can maintain the dead-air cells 30 between the pellets 26 over time. The amount of dead-air cells 30 between the pellets 26 of pelletized insulation material 20 will be dependent on the pellet size distribution and the shapes of the individual pellets 26 of insulation material 20.

In another aspect of the invention, the pelletized material can be mixed with a vehicle system or resin system to provide a coating composition that can be coated on to the surface of an assembly, such as a ceiling, partition, or wall, the interior surface of a vehicle, motor housing or appliance, or the exterior surface of a storage vessel, tank, pipe or duct. The pelletized material, when used in a coating composition, preferably has an average pellet size of about 1 mm to about 12 mm and comprises about 20% to about 80% by weight of the coating composition. It will be appreciated that the average pellet size and weight percentage of the pelletized material in the coating composition can be greater or lower depending on the formulation and the specific use.

The resin system used in the coating composition can include polymers, such as resins, latexes, urethanes, silicones, epoxies, and acrylics, alkyd, oleoresinous vehicles, as well as water reducible resins and other well-known polymers that are used in coating compositions. The polymers should preferably be in the form of a liquid in an uncured state and readily solidify once cured. Curing of the polymers can be performed by, for example, drying or chemical reaction.

The coating composition should have a viscosity that allows the coating composition to be readily applied to surfaces by established techniques of spray coating, dip coating, extrusion coating, flow coating, spread coating, brush coating, pouring, or gravity flow methods. Depending on the particular formulation, the viscosity of the coating composition can be modified (e.g., lowered) by including one or more diluents (e.g., water or glycol) and/or other liquids. The diluent and/or other liquid should readily dilute the resin system but not dilute or solvate the pelletized material.

Optionally, the coating composition can include other compounds, such as fillers and other ingredients described above, which can be added to the pelletized material. One particular ingredient that can be advantageously provided in the coating composition is a pigment or colorant. The pigment or colorant can be used to readily distinguish different formulations, end use applications, or different coating composition, which are applied to particular surfaces.

In a further aspect of the invention the pelletized material can be mixed with a viscous resin or polymer to provide an adhesive, mastic, or paste that can be installed in a cavity or on the surface of an assembly or structure. The pelletized material, when used in a mastic or paste composition, preferably has an average pellet size of about 1.0 mm to about 25.0 mm and comprises about 20% to about 95% by weight of the mastic or paste composition. It will be appreciated that the average pellet size and weight percentage of the pelletized material in the adhesive, mastic, or paste composition can be greater or lower depending on the formulation and the specific use. It will also be appreciated that a pigment or colorant can be included in the adhesive, mastic, or paste composition to readily distinguish different formulations, end use applications, or different adhesive, mastic, or paste compositions.

The viscous resin or polymer used to form the mastic or paste can include any resin polymer that can act as a bonding agent to hold the pellets together and/or bind the mastic or paste to the surface or substrate. Examples of polymers or resins that can be used include polyesters, polyamides, polyurethanes, epoxies, silicones, latexes, alkyds, oil resinous vehicles, water reducible resins, polybutadiene SBR polymers, ethylene vinyl acetate (EVA) or EVA copolymers, and acrylics/acrylates, as well as other well-known polymers that are used in mastic or paste compositions. The polymers should preferably be a viscous liquid in an uncured state and readily solidified once cured. Curing of the resin or polymers can be performed, by for example drying or chemical reaction.

The mastic or paste should have a viscosity such that the mastic or paste can be applied to surfaces or cavities by, for example, troweling, brushing, pouring, spraying, pumping or gravity flow techniques. Depending on the particular formulation, the viscosity of the coating composition can be modified (e.g., lowered or increased) by including a viscosity modifier or by adjusting the formulation of the resin system.

Optionally, the mastic, adhesive, or paste composition, like the coating composition, can include other ingredients, such as fillers, colorants, and agents described above, which can be added to the pelletized material. It will be appreciated that other fillers, colorants, or agents besides the fillers, colorants, and agents described above can be used in accordance wit the present invention.

Figure 3:
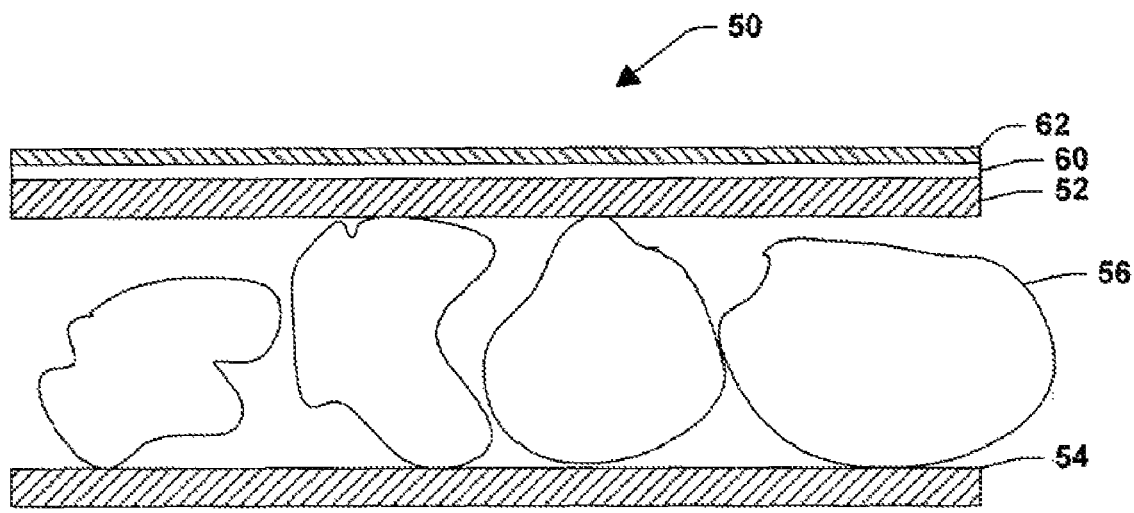
FIG. 3 illustrates the pelletized material provided in a compounded tape or roll composition in accordance with an aspect of the invention.

In still another aspect, the pelletized material can be provided in compounded tape or roll form. FIG. 3 is a sectional view diagrammatically illustrating one embodiment of the compounded tape 50. The compounded tape 50 includes a first substrate film 52, a second substrate film 54 extending substantially parallel to the first film 52 and a plurality of pellets 56 of the material in accordance with the present invention adhered between the first substrate film 52 and the second substrate film 54.

The material used to form the first substrate film 52 and the second substrate film 54 is not subject to any particular limitation as long as it can support the pelletized material. Materials that can be used to form the first substrate film 52 and the second substrate film 54 include, for example, plastic films, such as polypropylene films, ethylene/propylene copolymer films, polyester films or poly(vinyl chloride) films; papers such as Japanese paper or kraft paper; fabrics such as cotton fabrics or staple-fiber fabrics; nonwoven fabrics, such as polyester nonwoven fabrics or vinyl nonwoven fabrics; and metal foils. The plastic films may be either unstretched films or stretched (uniaxially stretched or biaxially stretched) films.

The above-mentioned substrates can have an average thickness of about 1 mm to about 4 mm or more. The first substrate 52 and the second substrate 54 can include a nonporous film or a porous film or mesh. When a porous film or mesh is to be used as a substrate, any material can be used as long as it can be processed into a porous film or mesh. One example of a porous film or mesh can be made from a polyolefin resin, for example, polyethylene, polypropylene, ethylene/vinyl acetate copolymer and the like. The porous film or mesh allows condensed moisture to evaporate or drain from the material once installed, and allows the insulating value to be maintained.

The pelletized material can be adhered between the first substrate and the second substrate using conventional adhesives (not shown). Such adhesives can include, for example, a viscous resin or polymer that can act as a bonding agent to bind the pellets to the surfaces of the substrates. Examples of polymers or resins that can be used include polyester, polyamides, polyurethanes, epoxies, silicones, latexes, alkyds, oleoresinous vehicles, water reducible resins, polybutadiene SBR polymers, and acrylics/acrylates, EVA copolymers, as well as other well-known polymers used in adhesive formulations.

The first substrate film 52 and/or the second substrate film 54 can optionally include an outer adhesive layer 60 and a release liner 62. The outer adhesive layer can be coated on at least one of the first substrate 52 and the second substrate 54 with, for example, an aqueous dispersion type pressure-sensitive adhesive composition to form the adhesive layers. The release liner 62 can then be bonded to the resulting outer adhesive layer 60.

The release liner 62 can comprise a sheet substrate and be disposed on the outer adhesive layer. The release liner 62 may be the conventional release liner. Optionally, the release liner 62 may comprise a release coating that is applied to an outer surface of the compounded tape 50 opposite the surface to which the outer adhesive layer is applied. This allows the compounded tape 50 to be wound so that the outer adhesive layer 60 is in contact with the release layer when stored in a rolled state.

The compounded tape so formed can have an average thickness of, for example, about 0.5 cm to about 5 cm. The thickness as well as the width of the compounded tape can vary depending on the specific application. For example, the compounded tape can have a thickness greater than about 5 cm or less than about 0.5 cm.

In yet another aspect of the invention, the pelletized material can be provided in flexible bags or in a resin starved paste in a backing or bag. The bags can be used as insulation to fill cavities in construction assemblies, such as the stud area of building construction. The bag can be perforated mesh or porous bag and be formed, for example, from a polymer mesh, such as a polyethylene web. The perforated mesh or porous bags allow condensed moisture to evaporate or drain from the pelletized material once installed and allows the insulating value to be maintained.

The bags can also be provided as perforated sheets that can be stored on rolls. The perforations can allow the bags to be readily removed from the sheets and allow for installation of the bags at various lengths.

Optionally, the pelletized material when used in a coating, mastic, compounded tape system, or other construction can be mixed with one or more spacer materials. The spacer materials can be used to inhibit or mitigate compaciton of the pelletized material. The spacer materials can also assure desired insulation thickness by defining a thickness of the coating, mastic, or compounded tape system for the desired application. The spacer material can, for example, comprise particles that have an average dimension size that is greater than the dimension size of the pelletized material.

Figure 4:
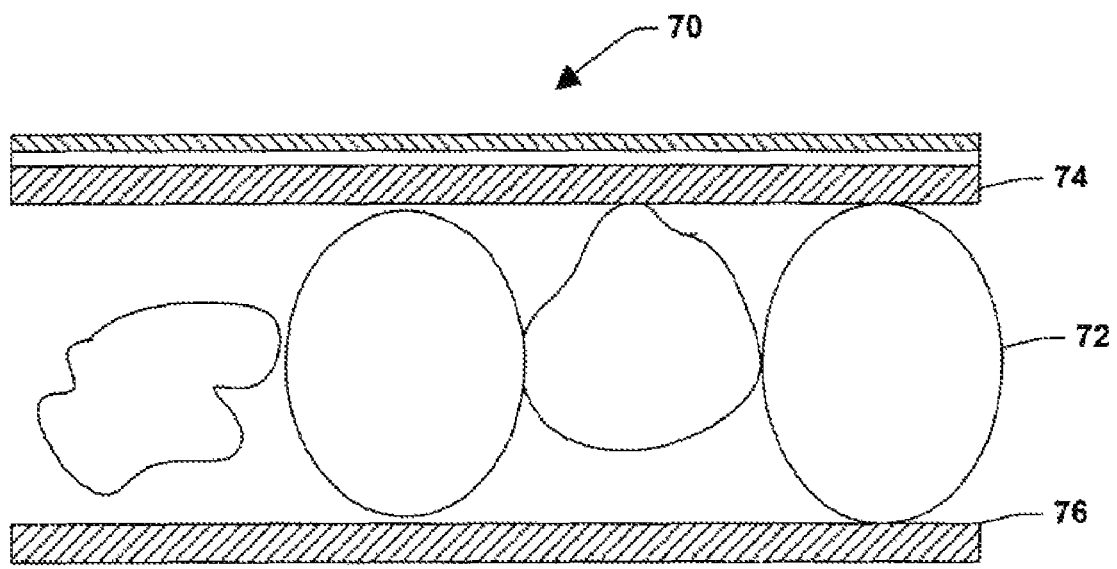
FIG. 4 illustrates the compounded tape of FIG. 3 with a plurality of spacers.

FIG. 4 illustrates one example of the use of spacer materials in accordance with the present invention in a compounded tape system. Referring to FIG. 4, the compounded tape 70 has a construction similar to the construction of the compounded tape as illustrated in FIG. 3, except a plurality of spacer materials 72 are provided between the first substrate 74 and the second substrate 76. The spacer materials 72 can separate the first substrate 74 and the second substrate 76 to define a desired thickness to the compounded tape 70. This allows the compounded tape 70 to be advantageously employed about structural assemblies where a predefined insulation thickness is required.

As a further application of the pelletized or particulate polymer, biomass, or mineral/ceramic based material described above, these products can be used as filler materials, extender materials, or spacer materials (e.g., industrial applications) in compounded plastics, adhesives, coating, mastics, grouts, cements, and the like. For filler or extender applications, the particles can have an average size of about 0.1 mm to about 12 mm (e.g., about 0.1 mm to about 2.5 mm). For spacer applications, the particles can have an average particle size of about 12 mm to about 25 mm. The pelletized material can provided in polydiverse particle shapes, sizes, and materials to optimize density, application characteristics, volume packing, acoustic, thermal, attenuation, cost factors, or combinations thereof.

The following examples are included to demonstrate various aspects of the invention. Those skilled in the art should, in light of the present disclosure, appreciate that many changes can be made in the specific aspects which are disclosed and still obtain a like or similar result without departing from the spirit and scope of the invention.

EXAMPLES

Example 1

Insulation Material

Prime or recycled polystyrene with additives provided in the form of polystyrene concentrate, or added during processing of the base material, was conducted through a heated barrel extruder and pelletized. The pelletized material contained a colorant or dye as an identifier, a flame retardant, and a biocide, as well as about 2% polypropylene as modifier to improve surface characteristics, heat and chemical resistance and mitigate static charge. The remainder of the formulation was comprised of prime or recycled polystyrene and pentane gas blowing agent.

Once the pellet was extruded, drawn, cooled and cut to size, it was expanded through a common steam-heated processing unit, which activated the pentane gas blowing agent, causing the expansion of the pellet into a bead of approximately 1 pound per cubic foot apparent bulk density and size ranges of about 2 mm to about 8 mm.

After cooling, the pellets were then coated with a small amount of coating, which contained complimentary colorant and other additives, such as supplemental biocide and fire resistant agents. This coating was applied at about 1% to about 5% weight concentration under low shear agitation and cured. The coating improved the surface properties of the insulation pellets, reduced odor or volatile emissions from the base polymer, and provided color identification.

The pellets so formed can be used as a loose fill, blown-in insulation or be compounded into a coating, liquid or mastic for structural assembly applications, and can be installed in attic or wall cavity areas. The pellets so formed exhibited an R-Value of about 2.5-3.5 per inch. Insulation pellets of this type are uniquely clean and non-dusty to handle, non-compressive and non-settling in application, resistant to moisture as well as the formation of mold, mildew or fungus.

Example 2

Filler or Extender Material

In a similar manner as Example 1, a filler or extender material was formulated using polystyrene, polyethylene, polypropylene, or blends of these polymers or other polymers, including polyphenylene oxide, to produce lightweight, expanded or foamed pellets.

One example of such a pellet was produced using about 98% polystyrene and about 2% polypropylene in an extruded blend, which was then drawn, cooled and cut to size. Thereafter, it was processed through an expander and formed into beads of about 1 to about 2 pounds per cubic foot apparent bulk density. The particle size varied from about 0.3 mm to about 6 mm, and the particles were essentially rounded, prilled or beaded in shape.

These beaded filler products were then coated to enhance surface characteristics, increase chemical resistance and improve compatibility in various resin systems and polymer compound formulations. Lightweight filler beads of this type are uniquely low in resin absorption, minimal in abrasion and allow lower density products than can be formulated with commonly available fillers.

From the above description of the invention, those skilled in the art will appreciate improvements, changes, and modifications. Such improvements, changes and modifications are intended to be covered by the appended claims.

Having described the invention, I claim the following:

1. A plurality of free-flowing pellets comprising:
   a blend of a first polymer and a second polymer, the second polymer blooming to the surface of each pellet to provide a skin of the second polymer on the pellets during formation of the pellets, the pellets having a specific gravity of at least about 0.01 to about 0.3, the pellets being dimensionally stable, dust-free, non-hygroscopic, and resistant to settling and compression.

2. The pellets of claim 1, further comprising an expanded, foamed, or multi-cellular material.

3. The pellets of claim 2, the expanded material including at least one of expanded polymers.

4. The pellets of claim 1, having an R-value of about 2.0 to about 4.0.

5. The pellets of claim 4, being encapsulated with a coating.

6. The pellets of claim 5, the coating being free of voids and comprising less than about 20% by volume of the pellets.

7. The pellets of claim 5, the coating being selected from the group consisting of a coupling agent, a urethane, an epoxy, an acrylic, a silicone, an oleoresinous vehicle, a latex, a water reducible resin, and blends thereof.

8. The pellets of claim 1, further including at least one of a biocide, fungicide, insecticide, mildewcide, bactericide, rodenticide, colorant, flame retardant, smoke suppressant, radiation absorber, or anti-blocking agent.

9. The pellets of claim 1, when applied having a bulk density of about 1 to about 18 pounds per cubic foot.

10. The pellets of claim 1, being free-flowing and having an average size of about 0.1 mm to about 25 mm.

11. The pellets of claim 1, being provided in a coating composition or fluid carrier system, the coating composition or fluid carrier system being capable of adhering to the surface of a structural assembly.

12. The pellets of claim 11, further comprising a plurality of spacer beads, the thickness of the coating being defined by the thickness of the spacer beads.

13. The pellets of claim 1, being provided in at least one of an adhesive, mastic, paste, spackle, or stucco.

14. The pellets of claim 1, further comprising a flexible sheet, the pellets being adhered to the sheet.

15. The pellets of claim 14, the flexible sheet and the adhered pellets being provided in a roll or compounded tape form and capable of being wrapped about a structural assembly.

16. The pellets of claim 15, further comprising a plurality of spacer beads, the spacer beads defining the thickness of the roll or compounded tape.

17. The pellets of claim 1, having a polydiverse pellet size and shape distribution.

18. The pellets of claim 1, being formed from foamed polymer strands, the strands being cut at the site of installation.

19. The pellets of claim 1, being fillers or extenders for industrial formulation and/or compounding applications.

20. A filler comprising:
a plurality of pellets, the pellets including a blend of a first polymer and a second polymer the second polymer blooming to the surface of each pellet to provide a skin of the second polymer on the pellets during formation of the pellets, the pellets having a specific gravity of at least about 0.01 to about 0.3, the pellets being dimensionally stable, substantially dust-free, substantially non-hygroscopic, and resistant to settling and compression.

21. The filler of claim 20, further comprising an expanded, foamed, or multi-cellular material.

22. The filler of claim 21, the expanded material including at least one of expanded polymers.

23. The filler of claim 20, having an R-value of about 2.0 to about 4.0.

* * * * *